E. W. BURGESS.
STEERING MECHANISM FOR TRACTION ENGINES.
APPLICATION FILED AUG. 19, 1916. RENEWED SEPT. 24, 1917.
1,328,710. Patented Jan. 20, 1920.
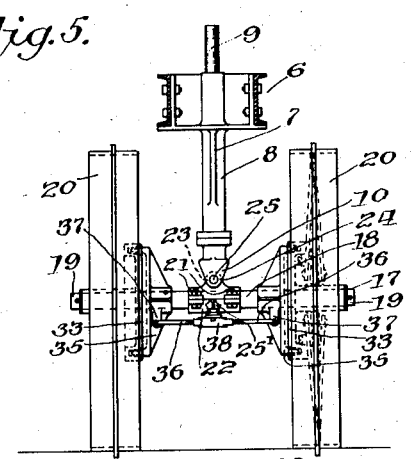
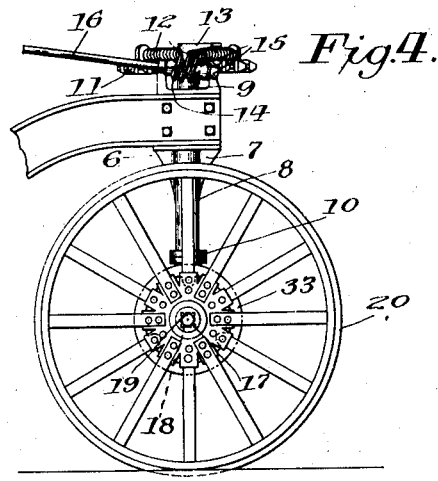
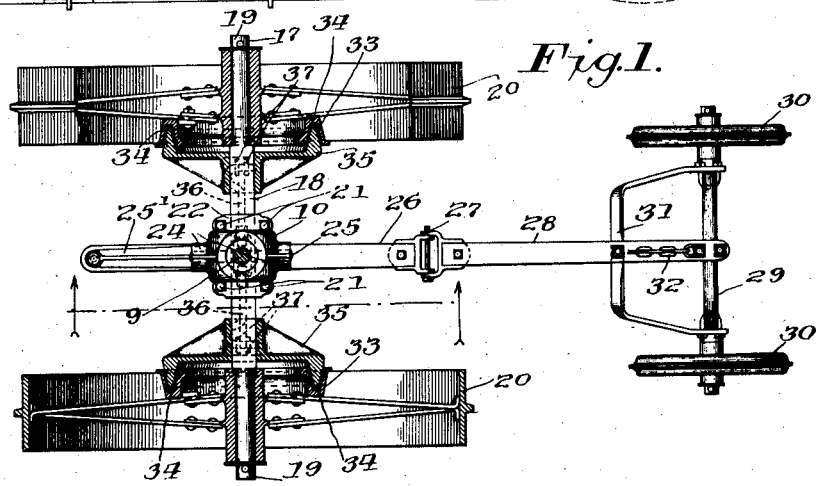
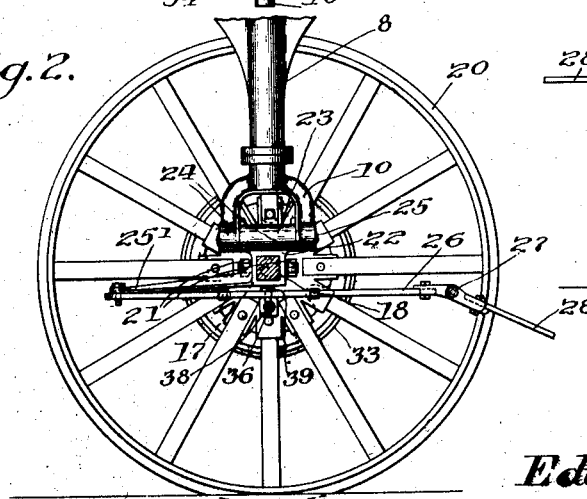
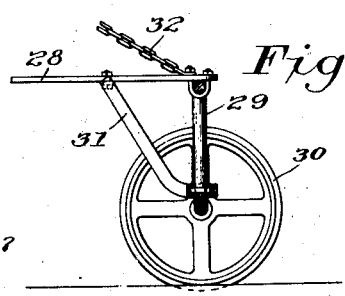
Inventor,
Edward W. Burgess,
By Chas. E. Lord
Atty.

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

STEERING MECHANISM FOR TRACTION-ENGINES.

1,328,710.  Specification of Letters Patent.  Patented Jan. 20, 1920.

Application filed August 19, 1916, Serial No. 115,854. Renewed September 24, 1917. Serial No. 193,033.

*To all whom it may concern:*

Be it known that I, EDWARD W. BURGESS, a citizen of the United States, residing at Chicago, in the county of Cook and State of Illinois, have invented certain new and useful Improvements in Steering Mechanism for Traction-Engines, of which the following is a full, clear, and exact specification.

My invention relates to steering mechanism for traction engines, and is adapted for use in particular with a tractor having a steering axle with steering wheels journaled upon its opposite ends and pivotally connected at its middle with a vertically disposed spindle journaled upon the front end of the truck frame of the tractor and provided with means for yieldingly retaining the steering axle at any desired angle relative to the line of advance of the tractor; the object of the invention being to provide means including guide wheels adapted to travel in prepared furrows and mounted upon a steering arm operatively connected with the steering wheels in a manner to automatically maintain the steering axle at a proper angle relative to the prepared furrow with but little resistance by the guide wheels.

These objects are attained by means of the mechanism illustrated in the accompanying drawings, in which—

Figure 1 is a top plan view, partly in section of a tractor steering axle and wheels having my improved automatic steering mechanism connected therewith;

Fig. 2 is a section taken on the line 2—2 of Fig. 1;

Fig. 3 is a side elevation of the guide truck;

Fig. 4 is a side elevation of the front end of a tractor having a steering axle and a common form of manually operable steering mechanism connected therewith and embodying my invention; and Fig. 5 is a rear elevation of Fig. 1.

The same reference characters designate like parts throughout the several views.

6 represents the front end of the truck frame of a tractor including a bolster member 7 having a depending tubular member 8 integral therewith, in which is journaled a shaft 9 having a yoke 10 secured to its lower end and a toothed sector 11 mounted upon its upper end and yieldingly connected, by means of compression springs 12, with a bracket member 13 secured to the shaft. 14 represents a worm engaging with the sector and journaled in bearing members 15 secured to the truck frame, and 16 the usual manually operable shaft connected with the worm. 17 represents a steering axle having preferably a rectagular body 18 and reduced cylindrical portions 19 at its opposite ends, upon which are journaled steering wheels 20. Secured to the middle of the body of the axle by means of bolts 21 is a rectangular two-part sleeve 22, having integral with its upper part a longitudinally disposed barrel member 23 that is received between the arms 24 of the yoke 10 and connected therewith by means of a hinge pin 25 whereby the axle is permitted a limited oscillatory movement relative to the depending tubular member 8. Integral with the sleeve 22 is a rearwardly extending arm 25¹, to which is pivotally connected the rear end of a forwardly extending guide bar 26 that is hingedly connected at its front end, by means of hinge members 27, with the rear end of a supplemental guide bar 28, having secured to its front end an arched axle 29, upon the lower outward ends of which are journaled guide wheels 30 adapted to travel in portions of prepared furrows, and 31 represents a U-shaped brace member secured to the axle and guide bar. The hinge connection between the two members of the guide bar permits the operator to lift the guide wheels from the guide furrows, as by means of a flexible member 32 connected with the axle 29 and leading upward and rearward toward the operator upon the tractor, as when turning at the end of a field. Rotatable with each of the steering wheels 20 are clutch rings 33 provided with inwardly directed openings and V-shaped annular faces 34, and slidably mounted upon the body of the steering axle 17 are complemental clutch elements 35 adapted to coöperate with the clutch rings carried by the steering wheels. 36 represents transversely disposed clutch controlling links having their outside ends pivotally connected with ear members 37 carried by the clutch elements 35 and their inner threaded ends adjustably connected with opposite ends of a turn buckle member 38, having an opening at its middle that receives a stud 39 carried by the guide bar 26, that is thereby pivotally connected to the turn buckle. The brake described above is to be taken as illustrative only, as it is clear that other forms of braking mechanism, many of which are old in the art, could very readily be used in this connection. Applicant wishes it understood, therefore, that he is not limited to this specific form of brake.

In operation the guide wheels 30 are lowered into the guide furrows prepared on the preceding round by suitable markers carried by the implement being operated by the tractor, as a seeder, planter or cultivator, with the steering axle of the tractor adjusted at right angles with the guide furrows and the line of advance of the tractor, in which position it is yieldingly retained to a limited extent by means of the buffer springs 12. If, as the tractor advances, one of the guiding wheels 30 meets with an obstruction sufficient to turn the steering axle about its axis in a manner to carry the wheel at the opposite end thereof ahead of its normal position, the arm 25¹ turning with the axle will swing the rear end of the guide bar 26 laterally and the depending stud 39 carried thereby will move the turn buckle 38 in a direction to cause an engagement of the clutch members 33 and 35 in a manner to automatically chock the advanced wheel and compel the companion steering wheel to regain a normal position, the guide furrows acting as a restraint against the guide wheels and preventing the supplemental guide bar 28 from swinging laterally at its front end. With the mechanism as described, a relatively slight resistance against a lateral movement of the steering truck in opposite directions will be sufficient to maintain the tractor unerringly in a given line of advance, the mechanism being extremely sensitive in character to abnormal turns of the steering axle of the tractor as it advances.

Having shown and described one embodiment of my invention, I do not desire that it be limited to the specific details of the structure as illustrated, it being understood that changes may be made in the form, proportion and organization of its various parts without departing from the spirit of the invention as indicated in the appended claims.

What I claim as my invention and desire to secure by Letters Patent is:

1. In a tractor steering mechanism, a pivoted steering axle, a ground contacting guide arm pivotally connected with the axle at a point behind the steering axle, and means actuated by relative movement of the axle and arm for returning them to normal position.

2. In a tractor steering mechanism, a steering axle, steering wheels journaled upon opposite ends of said axle, steering elements controlled by a guide furrow, and operative connections between said steering elements and said steering axle and said steering wheels whereby said wheels are automatically chocked when they turn from a correct line of advance.

3. In a tractor steering mechanism, a steering axle turnable about a central vertical axis, steering wheels journaled upon opposite ends of said axle, an arm secured to said axle, a guide bar having one end thereof pivotally connected with said arm, steering elements carried by the opposite end of said bar and adapted to be controlled by a guide furrow, and wheel chocking elements carried by said guide axle and said steering wheels and controlled by said steering bar.

4. In a tractor steering mechanism, a steering axle turnable about a central vertical axis, steering wheels journaled upon opposite ends of said axle, an arm secured to said axle, a guide bar having one end thereof pivotally connected with said arm, steering elements carried by the opposite end of said bar and adapted to be controlled by a guide furrow, clutch elements rotatable with said steering wheels, movable clutch members carried by said steering axle and adapted to engage with said clutch elements, and operative connections between said movable clutch members and said guide bar.

5. In a tractor steering mechanism, a steering axle turnable about a central vertical axis, steering wheels journaled upon opposite ends of said axle, an arm secured to said axle, a guide bar having one end thereof pivotally connected with said arm, guide elements carried by the opposite end of said bar and adapted to be controlled by a guide furrow, clutch elements rotatable with said steering wheels, clutch members slidably mounted upon said steering axle and adapted to engage with said first clutch elements, and link connections between said slidable clutch members and said guide bar.

6. In a tractor steering mechanism, a steering axle turnable about a central vertical axis, steering wheels journaled upon opposite ends of said axle, an arm secured to said axle, a guide bar having one end thereof pivotally connected with said arm, guide elements carried by the opposite end of said bar and adapted to be controlled by a guide furrow, clutch elements rotatable with said steering wheels, clutch members slidably mounted upon said steering axle and adapted to engage with said first clutch elements, a turn buckle movable with said guide arm, and links having their inner ends adjustably connected with opposite ends of said turn buckle and their opposite ends connected with said slidable clutch members.

7. In a tractor steering mechanism, a steering axle turnable about a central vertical axis, steering wheels journaled upon opposite ends of said axle, an arm secured to said axle, a two-part guide bar having one end thereof pivotally connected with said arm, guide elements carried by the opposite end of said bar and adapted to be controlled by a guide furrow, a hinge connection between the two parts of said guide bar, a depending stud carried by one of the parts of said bar, clutch elements rotatable with said steering wheels, coöperating clutch elements slidably mounted upon said axle, a turn buckle engaging with said stud, and links having their inner ends adjustably connected with opposite ends of said turn buckle and their opposite ends pivotally connected with said slidable clutch elements.

8. In self-steering mechanism for tractors, the combination of a pivoted steering axle and wheels, a ground contacting guide arm pivoted to the axle between the wheels, a brake controlling each wheel and means for actuating one of the brakes upon relative movement of the arm and axle.

9. In self-steering mechanism for tractors, the combination of a pivoted steering axle and wheels, a forwardly extending ground contacting guide arm pivoted to the axle beneath and behind its pivot, a brake controlling each wheel and actuating connections between each brake and the guide arm.

10. In self-steering mechanism for tractors, the combination with a centrally pivoted steering axle and wheels, of a laterally movable guide arm connected to the axle and extending forwardly thereof in longitudinal alinement with the axle pivot, a ground contacting element on the forward end of the guide arm, normally inactive brake devices having complemental parts mounted on the steering axle and wheels respectively and connections between the guide arm and brake devices whereby a shift of the axle actuates the brake device of the advancing wheel.

11. In self-steering mechanism for tractors, the combination of a pivoted steering axle and wheels, a brake controlling each wheel, a ground contacting guide arm pivoted behind the axle and extending forwardly thereof between the wheels and means actuated by relative angular movement of the guide arm and axle for braking the wheel on the advancing end of the axle.

12. In self-steering mechanism for tractors, the combination with a centrally pivoted steering axle and wheels, of a furrow engaging guide element extending forwardly of the axle between the wheels and pivoted to the axle at a point behind its pivot and means interposed between the guide element and wheels for causing the wheels to take paths substantially parallel to that of the guide element.

13. An automatic steering attachment for tractors, comprising a supporting arm adapted to be fixed to a steering truck, a guide arm pivotally connected to the supporting arm and carrying a furrow-following element, oppositely extending links pivoted to the guide arm, and wheel-braking devices connected to the links and formed of complemental parts adapted for connection to the truck and steering wheels of a tractor.

14. An automatic steering attachment for tractors, comprising a horizontal supporting arm adapted to be fixed to a steering truck to extend rearwardly therefrom, an oppositely extending guide arm pivoted to the supporting arm, a hinged extension on the guide arm carrying a furrow-following element, transverse links pivoted to the guide arm in advance of its pivot, and wheel-braking devices connected to the links and formed of complemental parts adapted to be mounted on the truck and steering wheels of a tractor.

15. An automatic steering attachment for the steering truck of a tractor, comprising a guide arm, means on one end of the arm for pivotally connecting it to a steering truck, a furrow-following device on the opposite end of the arm, transverse links pivoted to the arm intermediate its ends, and wheel-braking devices attached to the links and having complemental parts for attachment to the truck and steering wheels of a tractor.

16. An automatic steering attachment for tractors, comprising a hinged guide arm, means on one end of the arm for pivotally connecting it to a steering axle, a furrow-following device on the opposite end of the arm, transverse links pivoted to the arm between its pivot point and hinge, and wheel-braking devices attached to the links and having complemental parts adapted to be mounted on the steering axle and wheels of a tractor.

In testimony whereof I affix my signature.

EDWARD W. BURGESS.